(12) United States Patent
Myers et al.

(10) Patent No.: US 6,911,160 B2
(45) Date of Patent: Jun. 28, 2005

(54) PHOSPHATE GLASS FOR USE IN THE MANUFACTURE OF ULTRA-SHORT LENGTH LASERS AND AMPLIFIERS

(75) Inventors: John D. Myers, Hilton Head, SC (US); Michael J. Myers, Hilton Head, SC (US)

(73) Assignee: Kigre, Inc., Hilton Head, SC (US)

( * ) Notice: Subject to any disclaimer, the term of this patent is extended or adjusted under 35 U.S.C. 154(b) by 126 days.

(21) Appl. No.: 10/394,612

(22) Filed: Mar. 21, 2003

(65) Prior Publication Data
US 2003/0181307 A1 Sep. 25, 2003

Related U.S. Application Data

(60) Provisional application No. 60/366,499, filed on Mar. 21, 2002.

(51) Int. Cl.[7] .............. C03C 4/12; C03C 3/16; C03C 3/17; C03C 3/18
(52) U.S. Cl. .............. 252/301.4 P; 65/390; 372/40; 501/47; 501/48; 501/73; 501/74; 501/75; 501/76; 501/77; 501/78
(58) Field of Search .............. 252/301.4 P; 65/390; 372/40; 501/47, 48, 73–78

(56) References Cited

U.S. PATENT DOCUMENTS

| 4,075,120 A | * | 2/1978 | Myers et al. ......... 252/301.4 P |
| 4,076,541 A | * | 2/1978 | Rapp .................... 501/48 |
| 4,239,645 A | * | 12/1980 | Izumitani et al. ...... 252/301.4 P |
| 4,470,922 A | * | 9/1984 | Denker et al. ........ 252/301.4 P |
| 4,820,662 A | * | 4/1989 | Izumitani et al. ........ 501/73 |
| 4,929,387 A | * | 5/1990 | Hayden et al. ....... 252/301.4 P |
| 4,962,067 A | * | 10/1990 | Myers .................... 501/45 |
| 5,032,315 A | * | 7/1991 | Hayden et al. ....... 252/301.4 P |
| 5,053,165 A | * | 10/1991 | Toratani et al. ....... 252/301.4 P |
| 5,173,456 A | * | 12/1992 | Hayden et al. .......... 501/45 |
| 5,322,820 A | * | 6/1994 | Myers et al. ........... 501/45 |
| 5,491,708 A | * | 2/1996 | Malone et al. ......... 372/41 |
| 5,526,369 A | * | 6/1996 | Hayden et al. ......... 372/40 |
| 5,982,973 A | * | 11/1999 | Yan et al. ............. 385/141 |
| 6,529,675 B1 | * | 3/2003 | Hayden et al. .......... 385/141 |

* cited by examiner

*Primary Examiner*—C. Melissa Koslow
(74) *Attorney, Agent, or Firm*—Howard & Howard

(57) ABSTRACT

A high-gain phosphate glass composition, which can be used to produce ultra-short gain length lasers and optical amplifiers is described wherein the composition of the glass in addition to exhibiting high gain for lasers and amplifiers, also exhibits high thermal shock resistance, high cross section, insignificant concentration quenching, and high solubility for rare earth ions and other properties which enable the material to be fabricated into a new class of ultra-short length micro-laser, fiber laser and amplifier configurations and designs.

5 Claims, 2 Drawing Sheets

PHOSPHATE GLASS FOR USE IN THE MANUFACTURE OF ULTRA-SHORT LENGTH LASERS AND AMPLIFIERS

RELATED APPLICATIONS

This application claims priority to U.S. Provisional Patent Application No. 60/366,499 filed on Mar. 21, 2002.

STATEMENT REGARDING FEDERALLY SPONSORED RESEARCH

Not applicable.

BACKGROUND OF THE INVENTION

The present invention relates generally to phosphate glasses and, more specifically, provides phosphate glass compositions that can be used in the manufacture of ultra-short length micro-laser, fiber laser and amplifier configurations and designs.

Glass fibers have been widely used in the telecommunications industry to transmit high volumes of optical signals at high speeds. Traditionally, these glass fibers have been fashioned from fused silica-based compositions. Optical signals transmitted through fused silica glass fibers, however, eventually weaken when transmitted across long distances. Therefore, it is necessary to amplify the transmitted optical signals at various stages along the length of these silica glass fibers.

Optical glass lasers and amplifier devices have traditionally have been made of silica or fluoride based compositions. One method of amplifying the transmitted optical signal has been to insert a doped, fused silicate or a doped fluoride glass to amplify the strength of the optical signal being transmitted through the silica-based glass fibers. Doping is typically done with low levels of elements from the Lanthanide series of the Periodic Table. One such doped glass is disclosed in U.S. Pat. No. 5,322,820, filed on Dec. 8, 1992, the content of which is incorporated by reference herein. Doped, phosphate-based glass is also known to amplify the signal transmitted through the fused silica glass, however, in the past is has been very difficult to fuse or splice phosphate glass to the silica glass fibers because the two glasses have very different physical properties. In a recently filed application the present inventors provide a doped phosphate-based glass that can be readily fused to silica glass fibers. The application is U.S. application Ser. No. 10/366,734, filed Feb. 14, 2003.

One advantage of a phosphate based laser and optical amplifier glass host is its ability to provide high gain in short optical paths. The highest gain in the shortest possible length will be achieved by introducing the highest possible rare earth lasing ion concentration into the glass. Very high rare earth ion concentrations in past glasses have typically resulted in concentration quenching or "clustering" of the ions leading to energy loss and a reduction in gain.

Telecommunications optical amplifier devices based upon silica glass typically have gain figures of ~0.025 dB/cm. Other glass optical amplifier materials such as fluoride glasses may exhibit higher gain figures per unit length (~0.13 dB/cm) but are still limited by strength, up-conversion losses, and other properties when compared to phosphate glasses. Previous phosphate glasses have provided gain figures of 0.5 to 3 dB/cm.

SUMMARY OF THE INVENTION

The present invention provides phosphate glass compositions for rare earth doped laser and optical amplifier applications that exhibit high thermal shock resistance, high cross section, insignificant concentration quenching, and high solubility for rare earth ions and other properties which provide high gain in short optical path lengths. These phosphate glass compositions also have good chemical durability and exhibit high gain when doped with active ions for use as micro-chips, micro-disks, fiber lasers and fiber amplifiers.

In one embodiment the present invention is a phosphate glass composition comprising: from about 60 to 75 mole percent $P_2O_5$; from about 8 to 30 mole percent of $X_2O_3$, wherein X is selected from the group consisting of aluminum, boron, lanthanum, scandium, yttrium, and combinations thereof; from about 0.5 to 25 mole percent $R_2O$, wherein R is selected from the group consisting of lithium, sodium, potassium, and combinations thereof; and from about 2 mole percent to the limit of solubility of one or more lasing ions selected from the group consisting of cerium, praseodymium, neodymium, promethium, samarium, europium, gadolinium, terbium, dysprosium, holmium, erbium, thulium, ytterbium, lutetium, copper, chromium, and combinations thereof.

In another embodiment the present invention is a phosphate glass composition comprising: from about 60 to 75 mole percent $P_2O_5$; from about 8 to 30 mole percent of $X_2O_3$, wherein X is selected from the group consisting of aluminum, boron, lanthanum, scandium, yttrium, and combinations thereof; from about 0.5 to 25 mole percent $R_2O$, wherein R is selected from the group consisting of lithium, sodium, potassium, and combinations thereof; from about 2 mole percent to the limit of solubility of one or more lasing ions selected from the group consisting of cerium, praseodymium, neodymium, promethium, samarium, europium, gadolinium, terbium, dysprosium, holmium, erbium, thulium, ytterbium, lutetium, copper, chromium, and combinations thereof; and from 0.5 to 15 mole percent of at least one of MO, wherein M is selected from the group consisting of magnesium, calcium, strontium, barium, zinc and combinations thereof; and a member selected from the group consisting of oxides of silicon, germanium, lead, tellurium and combinations thereof.

In another embodiment the present invention is a method of forming a high gain phosphate glass comprising combining from about 60 to 75 mole percent $P_2O_5$; from about 8 to 30 mole percent of $X_2O_3$, wherein X is selected from the group consisting of aluminum, boron, lanthanum, scandium, yttrium, and combinations thereof; from about 0.5 to 25 mole percent $R_2O$, wherein R is selected from the group consisting of lithium, sodium, potassium, and combinations thereof; and from about 2 mole percent to the limit of solubility of one or more lasing ions selected from the group consisting of cerium, praseodymium, neodymium, promethium, samarium, europium, gadolinium, terbium, dysprosium, holmium, erbium, thulium, ytterbium, lutetium, copper, chromium, and combinations thereof together to form the glass.

DETAILED DESCRIPTION OF A PREFERRED EMBODIMENT

Figure 1:
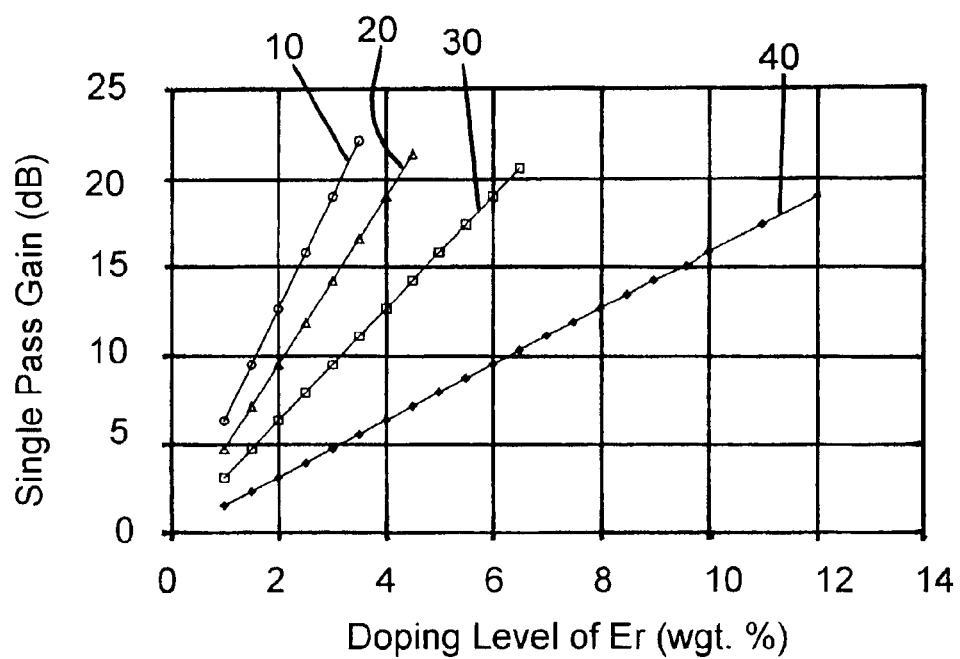
FIG. 1 is a graph showing the gain versus the Erbium doping level for several lengths of amplifiers designed according to the present invention.

In the present invention a new class of phosphate-based glasses have been developed which exhibit high solubility for rare earth lasing ions, low sensitivity to concentration quenching, low up conversion losses, and ion-exchangeability. As such, the glass of the present invention may be doped with much higher concentrations of rare earth lasing ions. These glasses can be fabricated into strengthened microchips, micro-disks, and/or fiber architectures. These fabricated glass elements may then be pumped hard enough to reach stimulated emission without exceeding the thermal glasses rupture strength or thermal loading limit of the glass. This allows for high laser and optical amplifier energy storage and energy extraction or gain in ultra short gain lengths.

The phosphate glass compositions according to the present invention comprise a mixture of $P_2O_5$, $X_2O_3$, $R_2O$, and one or more lasing ions from the group of the Lanthanides as displayed in the Periodic Table of the Elements and copper and chromium. Thus, suitable lasing ions preferably include the tri-oxide forms of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), copper (Cu), chromium (Cr), and mixtures of these components. Preferably, combinations of erbium and ytterbium are used. In the component $X_2O_3$, X is selected from the group consisting of aluminum (Al), boron (B), lanthanum (La), scandium (Sc), yttrium (Y), and combinations thereof. In the component $R_2O$, R is selected from the group consisting of lithium (Li), sodium (Na), potassium (K), and combinations thereof. Optional components include MO and additions from the group consisting of oxides of silicon (Si), germanium (Ge), lead (Pb), tellurium (Te) and combinations thereof. Wherein M is selected from the group consisting of magnesium (Mg), calcium (Ca), strontium (Sr), barium (Ba), zinc (Zn), and combinations thereof. Additions from the group consisting of oxides of Si, Ge, Pb, Te and combinations thereof may be added to modify the index of refraction and thermal expansion of the final glass.

The phosphate glass composition of the present invention can be drawn into glass fibers for splicing into typical silica glass optical fiber systems using standard techniques. These glass fibers typically have the structure of a core surrounded by an outer cladding as is known in the art. Both the core and the cladding made with the present glass may be doped to the limit of solubility with lasing ions described above without the previous problems of quenching and clustering of ions.

In the present invention, the preferred concentrations of the components in mole percentage are from about 60% to about 75% $P_2O_5$, from about 8 % to about 30% $X_2O_3$, from about 0.5% to about 25% $R_2O$, from about 0% to about 15% MO and from about 0 to about 15% from the series of oxides of Si, Ge, Pb, Te and combinations thereof. The lasing ions may be present in an amount up to their limit of solubility. Preferably the lasing ions are present in an amount of from 2 to 40 mole percent, more preferably from 8 to 35 mole percent, and most preferably from 10 to 30 mole percent. Glass according to the present invention has a higher glass transition temperature ($T_g$) and a lower themul expansion compared to typical phosphate glasses. In addition, because much higher levels of lasing ions can be used the glasses have very high gain, excellent chemical durability and high rupture strength. The present glass enables one to make excellent, low loss, fusion splices of fibers of these glasses to standard silica fibers. The splices can be accomplished using standard glass splicing equipment and techniques as is known in the art.

The present invention also provides phosphate glass compositions that satisfy the need for phosphate glass microchips, micro-disks, fiber lasers and fiber amplifiers capable of producing significantly higher gain values per unit gain length. This improvement in phosphate glass micro-chip, micro-disk, fiber laser and fiber amplifier materials permits replacing larger laser constructs and other more expensive and more cumbersome technology with the present glass.

Unlike other phosphate glasses, the present invention permits very high doping with lasing ions. Using a series of fiber lengths and doping levels a series of actual and computer modeled gain levels were determined and are displayed in FIG. 1. Reference line 10 was generated using a fiber having a length of 2 centimeters, reference line 20 was generated using a fiber having a length of 1.5 centimeters, reference line 30 was generated using a fiber having a length of 1 centimeter, and reference line 40 was generated using a fiber having a length of 0.5 centimeters. The results demonstrate that the glass of the present invention permits for very high gain of over 20 dB/cm even if the fiber is very short. Also the doping levels are higher than previously possible with phosphate glasses.

Contrary to expectations, fibers made with these compositions can be successfully fusion-spliced to conventional silica fibers using commercial fusion splicing equipment. A 1 centimeter glass fiber was prepared according to the present invention and doped with 2 mole percent erbium oxide and 22 mole percent ytterbium oxide. The fiber was then fusion spliced at both ends to a silica glass transmission fiber of Corning SMF-28. This system was subjected to a series of tests.

In a first test the fiber was pumped with 1310 nanometer (nm) light at 0.119 miliwatts (mW). The total throughput was 50% resulting in a throughput of 0.060 mW. The system was then used to test the effects of a side pumping with a 1 centimeter 975 nm diode bar array and a pump pulsewidth of 4 miliseconds. The results are shown in Table 1

TABLE 1

| Amps | DC voltage average | DC voltage peak | Ratio of peak to average | Pulse power Joules |
|---|---|---|---|---|
| 20.0 | 39.2 | 61 | 1.5561 | 0.0389 |
| 25.6 | 39.2 | 69.2 | 1.7653 | 0.0441 |
| 29.6 | 39.2 | 76 | 1.9388 | 0.0485 |
| 34.2 | 39.2 | 83 | 2.1173 | 0.0529 |

When the ratio reaches about 2 the fiber amplification is approximately 3 dB of gain, which is sufficient to overcome the internal losses. Using the present glass 13 centimeter fibers have been produced that have a gain of 38 dB.

Figure 2:
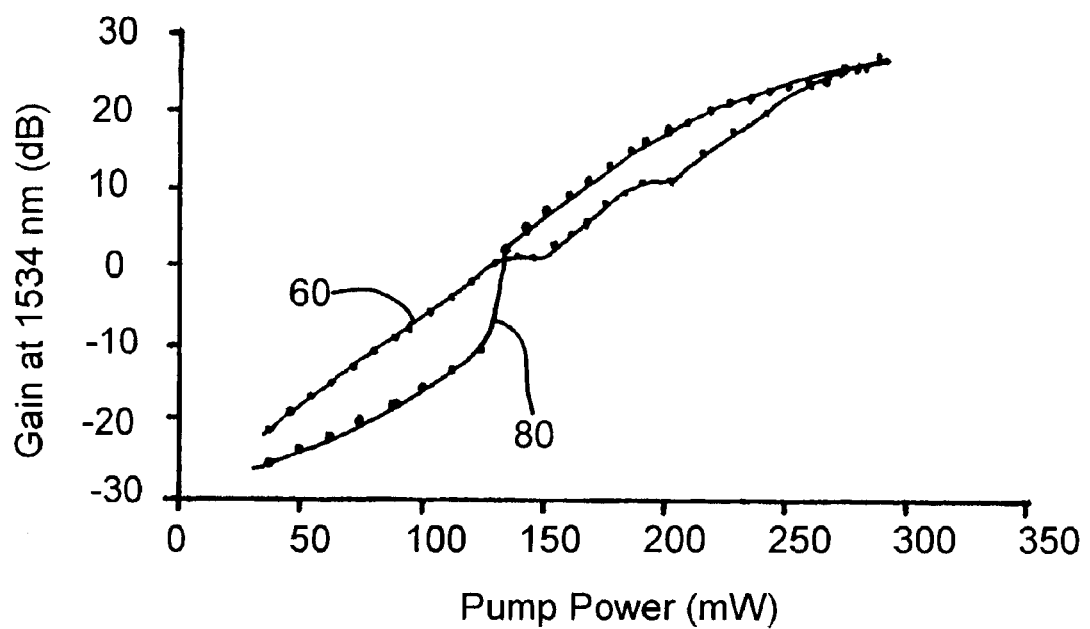
FIG. 2 is a graph showing the effect of pump power on gain for a glass fiber according to the present invention.

Using a 10 centimeter fiber prepared according to the present invention it was pumped as described above with varying amounts of power and the gain at 1534 nm was determined. The results are shown in FIG. 2, where reference line 60 represents pumping reverse full and ramp forward while reference line 80 is pumping forward full and ramp reverse. The results demonstrate the ability of the present glass to provide a high gain amplifier.

The present glass can be formed into any shapes including fibers, disks, microchips, micro-disks, or other shapes and elements.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A phosphate glass composition comprising: from about 60 to 75 mole percent $P_2O_5$; from about 8 to 30 mole percent of $X_2O_3$, wherein X is selected from the group consisting of aluminum, boron, lanthanum, scandium, yttrium, and combinations thereof; from about 0.5 to 25 mole percent $R_2O$, wherein R is selected from the group consisting of lithium, sodium, potassium, and combinations thereof; at least one of MO, wherein M is selected from the group consisting of magnesium, calcium, strontium, barium, zinc and combinations thereof and is present in an amount of from 0.5 to 15 mole percent; at least one of a member selected from the group consisting of oxides of silicon, germanium, lead, tellurium and combinations thereof and is present in an amount of from 0.5 to 15 mole percent; and from 10 to 30 mole percent of one or more lasing ions selected from the group consisting of cerium, praseodymium, promethium, samarium, europium, gadolinium, terbium, dysprosium, holmium, erbium, thulium, ytterbium, lutetium, copper, chromium, and combinations thereof.

2. The phosphate glass composition of claim 1 wherein the lasing ion is a mixture of erbium and ytterbium.

3. The phosphate glass composition of claim 2 wherein the amount of erbium is from 10 to 30 mole percent and the amount of ytterbium is from 10 to 30 mole percent.

4. A method of forming a high gain phosphate glass comprising combining the following oxides: from about 60 to 75 mole percent $P_2O_5$; from about 8 to 30 mole percent of $X_2O_3$, wherein X is selected from the group consisting of aluminum, boron, lanthanum, scandium, yttrium, and combinations thereof; from about 0.5 to 25 mole percent $R_2O$, wherein R is selected from the group consisting of lithium, sodium, potassium, and combinations thereof; from 0.5 to 15 mole percent of at least one of MO, wherein M is selected from the group consisting of magnesium, calcium, strontium, barium, zinc and combinations thereof; and from 0.5 to 15 mole percent of a member selected from the group consisting of oxides of silicon, germanium, lead, tellurium and combinations thereof; with from 10 to 30 mole percent of one or more lasing ions selected from the group consisting of cerium, praseodymium, promethium, samarium, europium, gadolinium, terbium, dysprosium, holmium, erbium, thulium, ytterbium, lutetium, copper, chromium, and combinations thereof; and converting the combination into said glass.

5. In a method for making a fiber, a disk, a microchip or a micro-disk, wherein the improvement is that the method includes the step of incorporating the glass of claim 1.

* * * * *